United States Patent
Rambo et al.

(10) Patent No.: US 12,503,244 B2
(45) Date of Patent: Dec. 23, 2025

(54) THERMAL MANAGEMENT SYSTEM FOR AIRCRAFT PROPULSION SYSTEM USING A FLOW OF COMPRESSED FLUID EXTRACTED FROM A COMPRESSOR SECTION

(71) Applicant: General Electric Company, Schenectady, NY (US)

(72) Inventors: Jeffrey Douglas Rambo, Mason, OH (US); Scott Gregory Edens, Milford, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/437,873

(22) Filed: Feb. 9, 2024

(65) Prior Publication Data

US 2024/0182180 A1 Jun. 6, 2024

Related U.S. Application Data

(62) Division of application No. 17/164,208, filed on Feb. 1, 2021, now Pat. No. 11,897,624.

(51) Int. Cl.
*B64D 33/08* (2006.01)
*B64D 33/04* (2006.01)

(52) U.S. Cl.
CPC ............. *B64D 33/08* (2013.01); *B64D 33/04* (2013.01)

(58) Field of Classification Search
CPC ... B64D 33/04; B64D 3/08; F02C 6/08; F02C 7/14
USPC ........................................................ 244/73 B
See application file for complete search history.

(56) References Cited

U.S. PATENT DOCUMENTS

| | | |
|---|---|---|
| 4,374,469 A | 2/1983 | Rannenberg |
| 5,012,646 A | 5/1991 | Speer |
| 5,123,242 A | 6/1992 | Miller |
| 5,255,506 A | 10/1993 | Wilkes et al. |
| 5,414,992 A | 5/1995 | Glickstein |
| 7,607,308 B2 | 10/2009 | Kraft et al. |
| 7,765,788 B2 | 8/2010 | Schwarz |
| 8,904,753 B2 | 12/2014 | Murphy |
| 9,038,399 B2 | 5/2015 | MacFarlane |
| 9,714,610 B2 | 7/2017 | Snape et al. |
| 9,976,479 B2 | 5/2018 | Scipio et al. |
| 10,024,738 B2 | 7/2018 | Conti et al. |
| 10,107,198 B2 | 10/2018 | Stearns et al. |
| 10,508,598 B2 | 12/2019 | Weiner |
| 10,513,981 B2 | 12/2019 | Pesyna et al. |
| 10,815,890 B2 | 10/2020 | Leamy et al. |
| 2010/0170218 A1 | 7/2010 | Eluripati et al. |
| 2011/0088405 A1 | 4/2011 | Turco |
| 2012/0109593 A1 | 5/2012 | Hall et al. |
| 2013/0092350 A1 | 4/2013 | N et al. |
| 2013/0097992 A1 | 4/2013 | Suciu et al. |

(Continued)

*Primary Examiner* — Brady W Frazier
(74) *Attorney, Agent, or Firm* — Dority & Manning, P.A.

(57) ABSTRACT

A thermal management system for a propulsion system of an aircraft includes a fluid circuit configured to provide a flow of a compressed fluid from a compressor section of the propulsion system to, in serial flow order, a first turbine, a compressor, a second turbine, a thermal load, and an exhaust sink. A heat exchanger is disposed in a fan stream of the propulsion system at a location along the fluid circuit between the compressor and the second turbine. The fluid circuit extends through and is in thermal communication with the heat exchanger.

10 Claims, 5 Drawing Sheets

(56) References Cited

U.S. PATENT DOCUMENTS

2017/0044984 A1    2/2017   Pesyna et al.
2020/0355121 A1   11/2020   O'Meallie et al.

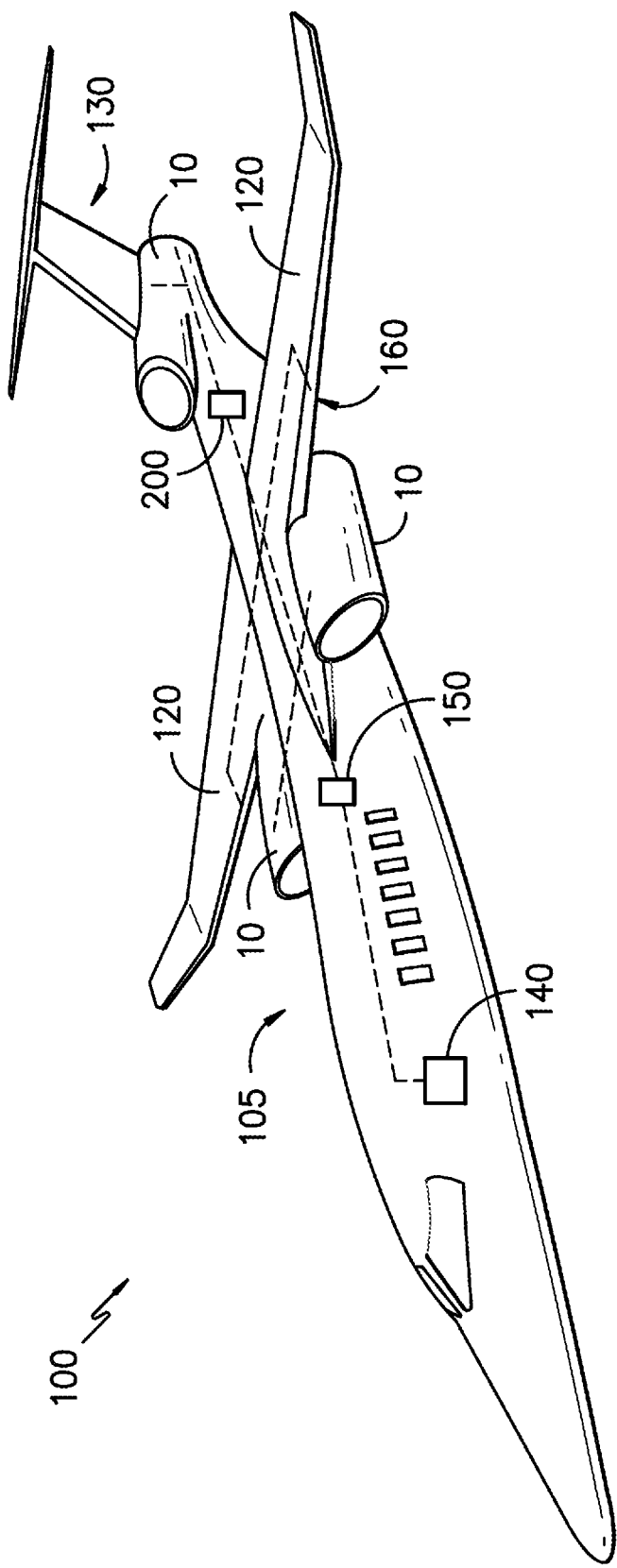
FIG. -1-

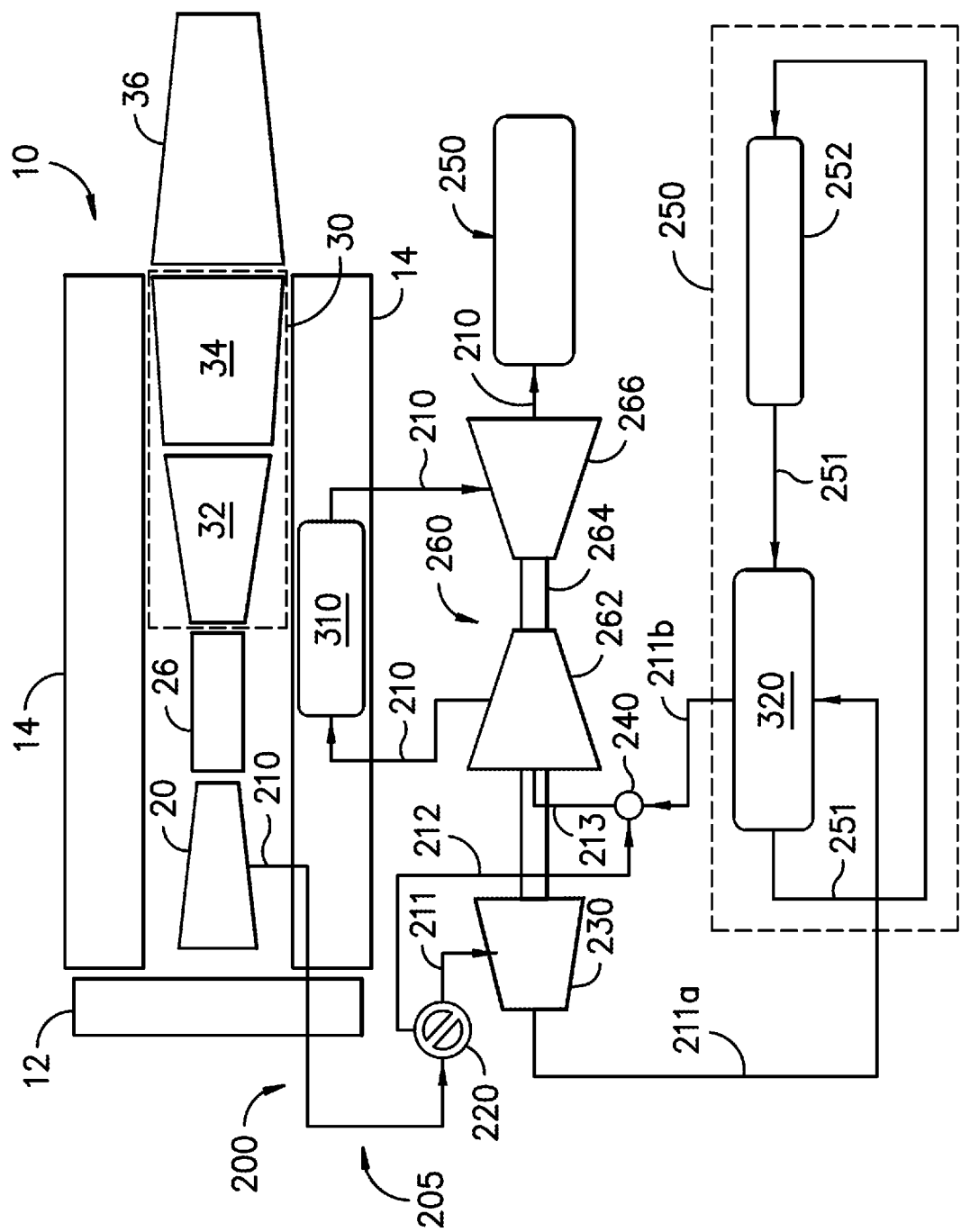
FIG. -2-

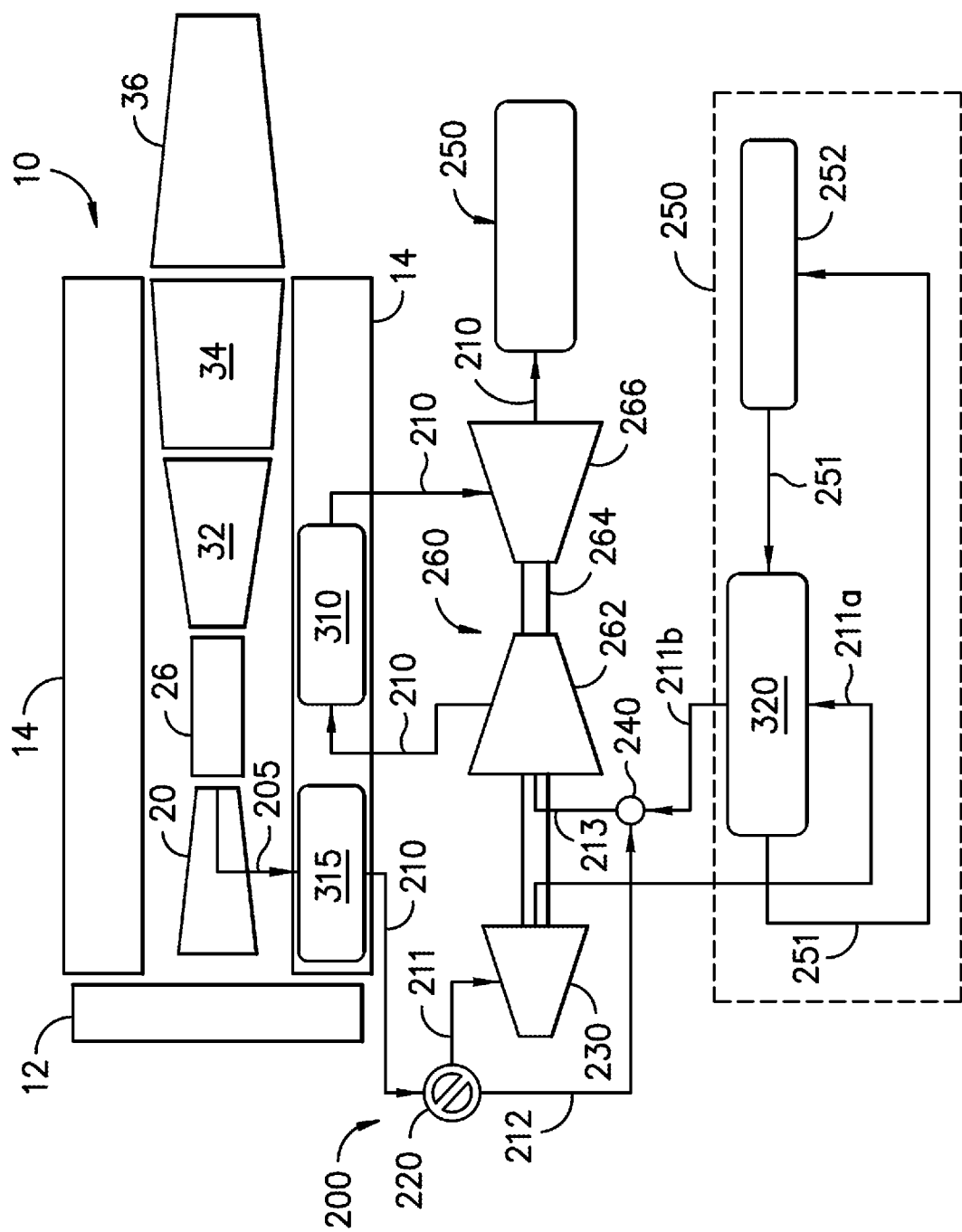
FIG. -3-

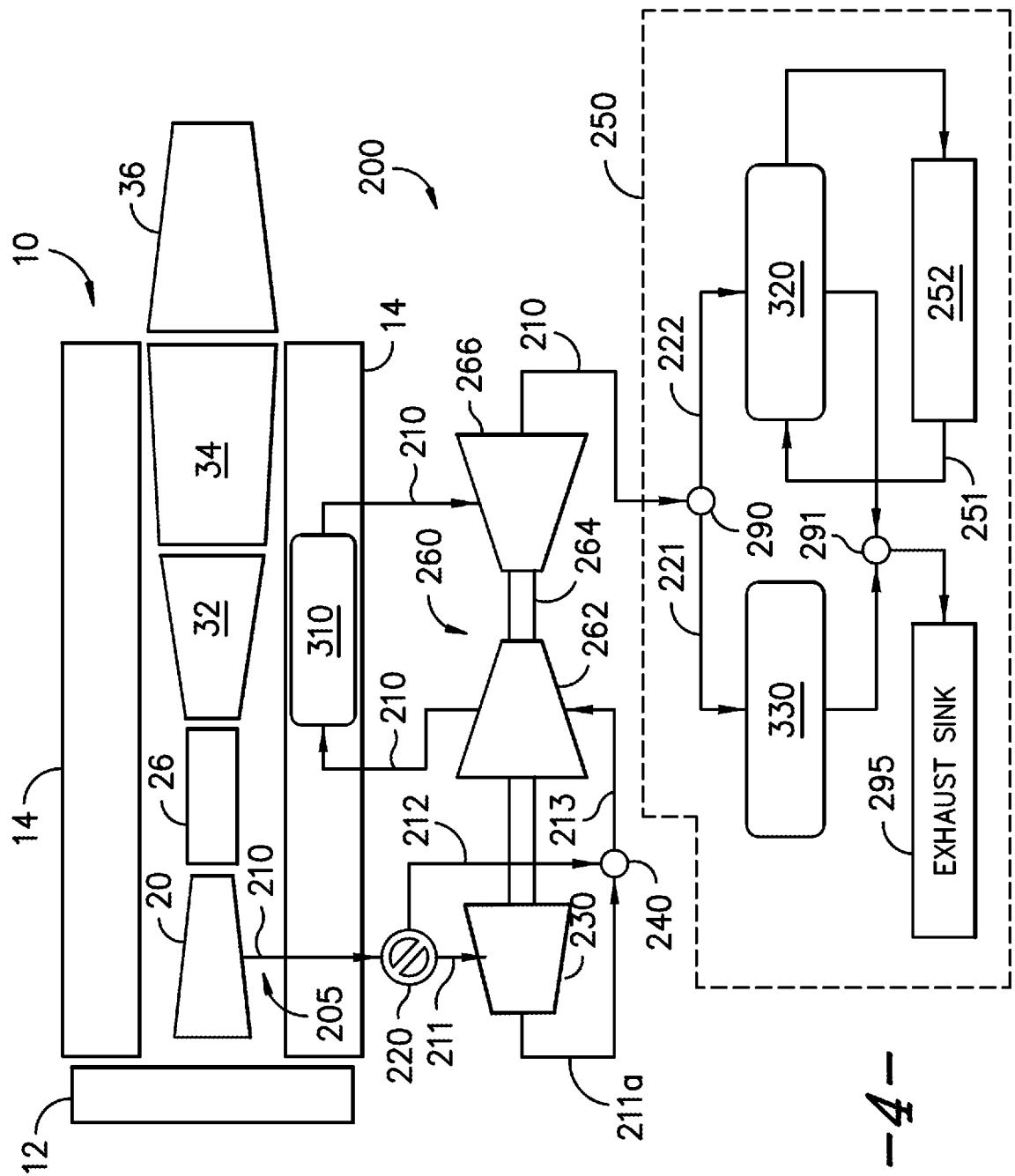
FIG. -4-

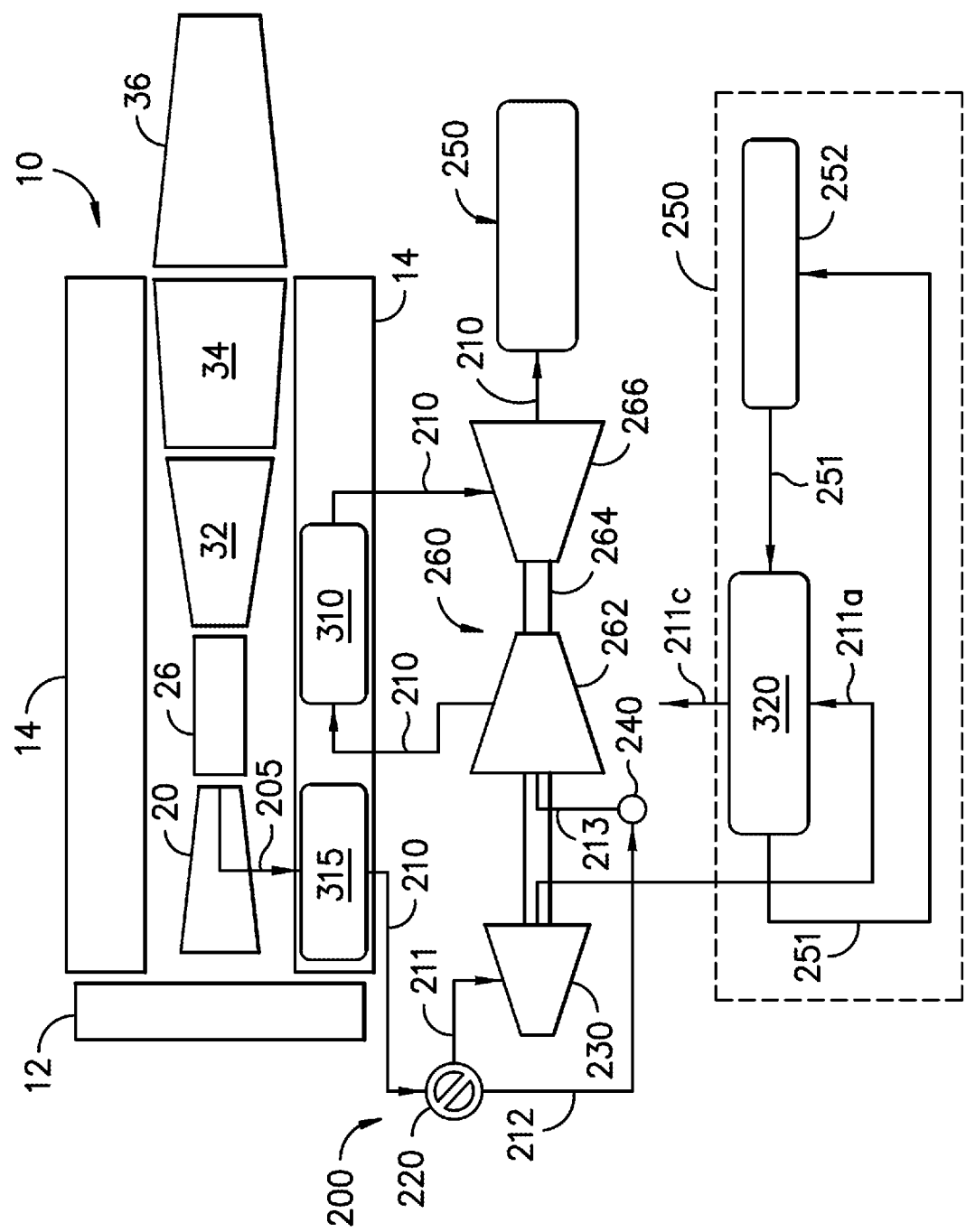
FIG. -5-

THERMAL MANAGEMENT SYSTEM FOR AIRCRAFT PROPULSION SYSTEM USING A FLOW OF COMPRESSED FLUID EXTRACTED FROM A COMPRESSOR SECTION

CROSS-REFERENCE TO RELATED APPLICATIONS

This application is a divisional application of U.S. application Ser. No. 17/164,208 filed Feb. 1, 2021, which is hereby incorporated by reference in its entirety.

FIELD

The present subject matter relates generally to methods and systems for thermal management for propulsion systems, and vehicles such as aircraft.

BACKGROUND

Engines, such as geared turbomachines or variable pitch fans, are challenged with thermal management of increasing thermal loads. Conventional systems may use an air stream to provide thermal attenuation of a fuel or lubricant. However, such configurations may result in fan stream blockage, reducing engine performance and efficiency. Conventional configurations may also be inadequate to attenuate thermal loads related to reduction gearboxes, variable pitch fans, or both. As such, there is a need for improved thermal management systems for lubricant systems and load devices.

BRIEF DESCRIPTION

Aspects and advantages of the invention will be set forth in part in the following description, or may be obvious from the description, or may be learned through practice of the invention.

A method and structure for thermal management for a vehicle is provided. The method includes extracting a flow of compressed fluid from a compressor section of a propulsion system in which the flow of compressed fluid includes a pressure parameter, and generating an output torque via expanding at least a portion of the flow of compressed fluid across a turbine operably connected to a driveshaft. The turbine is positioned downstream of the compressor section and upstream of a cooling system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is an exemplary embodiment of a vehicle including a propulsion system and thermal management system according to aspects of the present disclosure; and FIGS. 2-5 are schematic embodiments of the propulsion system and thermal management system according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a propulsion system, vehicle, and thermal management system are provided herein that may improve overall system and vehicle efficiency, such as through utilizing a relatively high pressure fluid from a compressor section of the propulsion system rather than utilizing a pressure regulator or releasing fluid to e.g., an atmospheric condition. As such, work extracted from air removed from the propulsion system may be maximized. Embodiments provided herein may further improve heat transfer from lubricant in a lubricant system. Still further, embodiments provided herein may improve heat transfer from lubricant and additionally from one or more load devices, such as computing systems, environmental control systems, or electric machines. Additionally, or alternatively, cooling fluid at the fluid circuit may be independently adjustable relative to operating condition at the propulsion system, such as via the flow control device and/or the flow device. Embodiments provided herein may include particular serial or parallel flows and components to advantageously improve heat transfer and overall system efficiency. Certain embodiments may allow for substantially independent adjustability of the heat exchange fluid relative to propulsion system operating condition, a lubricant system operating condition, or a load system operating condition.

Referring now to the drawings, in FIG. 1, an exemplary embodiment of a vehicle 100 including a propulsion system 10 and a thermal management system 200 according to aspects of the present disclosure is provided. In an embodiment, the vehicle 100 is an aircraft including an aircraft structure or airframe 105. The airframe 105 includes a fuselage 110 to which wings 120 and an empennage 130 are attached. The propulsion system 10 according to aspects of the present disclosure is attached to one or more portions of the airframe. In various embodiments, the thermal management system 200 is a system configured to desirably distribute thermal loads, such as to add or remove heat from one or more fluids or structures, such as, but not limited to, oxidizer at the propulsion system, fuel, lubricant, hydraulic fluid, pneumatic fluid, or cooling fluid for an electric machine, electronics, computing system, environmental control system, gear assembly, or other system or structure.

In certain instances, the propulsion system 10 is attached to an aft portion of the fuselage 110. In certain other instances, the propulsion system 10 is attached underneath, above, or through the wing 120 and/or portion of the empennage 130. In various embodiments, the propulsion system 10 is attached to the airframe 105 via a pylon or other mounting structure. In still other embodiments, the propulsion system 10 is housed within the airframe, such as may be exemplified in certain supersonic military or commercial aircraft.

Various embodiments of the vehicle 100 include a computing system 140, such as avionics or other electronics or computing devices configured to control the vehicle 100 or the propulsion system 10. The vehicle 100 may further include an environmental control system (ECS) 150, such as to provide thermally conditioned air to a cabin of the vehicle, the computing system 140, a vehicle surface anti-icing system 160, a propulsion system anti-icing system, or other system of the vehicle 100 or propulsion system 10. In various embodiments such as described herein, the thermal management system 200 may be configured to provide thermally conditioned fluid to one or more of the systems described herein.

Referring now to FIGS. 2-5 exemplary schematic embodiments of the propulsion system 10 and thermal management system 200 at the vehicle 100 (FIG. 1) are provided. The propulsion system 10 may generally be configured as a Brayton cycle machine. Particular embodiments of the propulsion system 10 may be configured as a turbomachine, a ramjet engine, or a scramjet engine. Still particular embodiments of the propulsion system 10 may include a turbomachine configured as a turbofan, turboprop, turbojet, turboshaft, propfan, or open rotor engine. Certain embodiments of the propulsion system 10 include a fan section 12, a compressor section 20, a combustion section or heat addition system 26, an expansion section 30, and an exhaust section 36 in serial flow arrangement. The fan section 12 includes one or more stages of rotors and blades. One or more fan streams 14 is positioned downstream of one or more stages of the rotors and blades. In certain embodiments, the fan stream 14 is positioned aft of a first stage fan rotor, such as generally defining a fan bypass of a turbofan engine. In still certain embodiments, one or more fan streams 14 is positioned aft of a second or more stage fan rotor (e.g., a low pressure compressor or booster), such as generally defining a third stream aerodynamically between the fan stream defining a fan bypass and a primary or core flowpath through the compressor section 20, heat addition system 26, and expansion section 30.

The compressor section 20, the heat addition system 26, and the expansion section 30 are generally positioned in serial aerodynamic flow arrangement. The compressor section 20, the heat addition system 26, and the expansion section 30 may together define a core engine or gas generator of the propulsion system 10. In various embodiments, the heat addition system 26 may be configured as a deflagrative combustion system or a detonative combustion system. The heat addition system 26 may include any suitable type of system for receiving a flow of liquid and/or gaseous fuel and generating hot gases, including, but not limited to, annular, can-annular, can, trapped vortex, volute or scroll, rotating detonation, pulse detonation, subsonic or supersonic combustion systems.

In certain embodiments, such as described herein, the compressor section 20 includes a high pressure compressor positioned in direct serial flow arrangement with the heat addition system 26 and a high pressure turbine 32 of the expansion section 30. A low pressure turbine 34 of the expansion section 30 may be operably coupled to the fan section 12 to drive the one or more stages of the fan section 12. In certain embodiments not depicted, the propulsion system 10 may include an intermediate pressure compressor positioned aerodynamically between the fan section 12 and the high pressure compressor, an intermediate press turbine positioned aerodynamically between the high pressure turbine 32 and the low pressure turbine 34.

Referring still to FIGS. 2-5, the thermal management system 200 includes walled conduits 205, such as pipes, manifolds, or other appropriate structures, forming a fluid circuit 210 configured in fluid communication to receive a fluid from the compressor section 20 of the propulsion system 10. The fluid is generally an oxidizer, such as compressed air, from the propulsion system 10. In certain embodiments, the fluid is extracted from the primary or core flowpath of the propulsion system 10. In a particular embodiment, the fluid is extracted from one or more stages at or aft of a high pressure compressor of the compressor section 20.

The thermal management system 200 further includes a flow control device 220 positioned at the fluid circuit 210 downstream of the compressor section 20. A turbine 230 is positioned at the fluid circuit 210 downstream of the compressor section 20. In particular embodiments, the flow control device 220 and the turbine 230 are integrated as a variable area turbine nozzle (VATN). The flow control device 220 and the turbine 230 together defining the VATN are together configured to control mass flow into or through the turbine 230. In one embodiment, the flow control device 220 is a variable area structure, such as a variable area nozzle, at an inlet of the turbine 230. However, in other embodiments, the flow control device 220 is a separate flow control structure configured to adjust mass flow through the turbine 230. In certain embodiments, the turbine 230 is downstream of the flow control device 220.

In certain embodiments, a flow device 240 is positioned at the fluid circuit 210 downstream of the flow control device 220 and the turbine 230. The flow control device 220 is configured to provide a first portion 211 of fluid to the turbine 230 in parallel with a second portion 212 of fluid provided from the flow control device 220 to the flow device 240. The flow device 240 is configured to combine, mix, or draw together the flows from the first portion 21 and the second portion 212. In various embodiments, the flow device 240 is a fluid mixer, ejector, or other appropriate device configured to allow the relatively higher-pressure stream of fluid at the second portion 212 to draw the relatively lower-pressure stream from first portion 211 together through the fluid circuit 210 as the combined flow of fluid depicted schematically at 213. The fluid circuit 210 is configured to provide the first portion 211 of fluid from the turbine 230 to the flow device 240. A thermal load 250 is positioned in thermal communication with the fluid circuit 210 downstream of the turbine 230.

In various embodiments, the flow control device 220 is a diverter valve or other appropriate mechanism configured to direct ratios or proportions of the first portion 211 and the second portion 212 to the turbine 230 and the flow device 240, respectively. The pressurized flow of fluid from the compressor section 20 is utilized to drive the turbine 230, such as depicted at first portion 211. In certain embodiments, such as depicted in FIGS. 2-4, the expanded, decreased-pressure fluid, depicted schematically at 211a, is then routed along the fluid circuit 210 from the turbine 230 to the flow device 240. In still certain embodiments, the expanded, decreased-pressure fluid 211a is routed along the fluid circuit 210 from the turbine 230 to thermal communication with a thermal load 250. After thermal communication with the thermal load 250, the fluid, depicted schematically via arrows 211b, may be provided to the flow device 240, such as depicted in FIG. 3. In another embodiment, the fluid 211b may be discharged or dumped, such as to an engine bay, under engine cowl, or to atmosphere, such as depicted in FIG. 5 at 211c. The flow device 240 is configured to receive the first portion 211 of fluid from the flow control device 220 and the second portion 212 of fluid from the turbine 230. In certain embodiments, the flow control device 220 is configured to provide the first portion 211 of fluid to the turbine 230 in parallel with the second portion 212 of fluid to the flow device 240, while the second portion 212 of fluid bypasses the turbine 230.

It should be appreciated that conventional thermal management systems generally utilize a valve to restrict or regulate flow from an engine compressor to an air cycle machine compressor. Such systems typically result in relatively large pressure losses across the valve. Such pressure losses result in substantially inefficiencies for the engine and thermal management systems by compressing the air at the engine compressor then dumping the excessive pressure to control or regulate the flow to the air cycle machine compressor. In contrast, embodiments of the present disclosure utilize the excessive pressure at the turbine 230 to produce useful work, such as provided herein.

The first portion 211 of fluid may generally include a first fluid characteristic different from the second portion 212 of fluid having a second fluid characteristic. In various embodiments, the first fluid characteristic includes a higher pressure or flow rate of the fluid than the second fluid characteristic. The flow device 240 is configured to receive the respective portions 211, 212 of fluid and provide the desired fluid (e.g., having a third fluid characteristic, depicted at fluid 213 of the fluid circuit 210, different from the first and second fluid characteristics of fluid 211 and fluid 212, respectively) downstream along the fluid circuit 210.

Referring to FIGS. 2-5, in various embodiments, the turbine 230 is operably coupled to a turbomachine 260 positioned at the fluid circuit 210. The turbomachine 260 includes a compressor 262 coupled by a driveshaft 264 with a turbine 266. In a particular embodiment, the turbomachine 260 is part of an air cycle system. The compressor 262 is positioned at the fluid circuit 210 downstream of the flow device 240. In a particular embodiment, the turbine 230 is operably coupled to the driveshaft 264 to provide energy to drive the compressor 262. In a still particular embodiment, the turbine 230 and the turbine 266 of the turbomachine 260 together provide energy to drive the compressor 262.

It should be appreciated that the flow control device 220 allows the fluid circuit 210 to selectively modulate a ratio or proportion of the first portion 211 and the second portion 212 to the turbine 230 and the flow device 240, respectively. In contrast to a pressure regulator configured to decrease pressure, resulting in work or energy loss for the propulsion system 10 and the thermal management system 200, the flow control device 220, such as defining a diverter valve or other appropriate device for selectively modulating a proportion of fluid flows to two or more circuits (e.g., first portion 211 and second portion 212), allows the turbine 230 to utilize the relatively high pressure fluid from the compressor section 20 to at least partially drive the turbomachine 260. The turbine 230 may correspond to a desired fluid characteristic (e.g., a desired second fluid characteristic) for the fluid egressing the turbine 230 to the flow device 240. Additionally, or alternatively, the turbine 230 may correspond to a desired energy output to the turbomachine 260 to which the turbine 230 is operably coupled.

Referring now to FIGS. 2-5, in various embodiments, the vehicle 100, propulsion system 10, and thermal management system 200 include a heat exchanger 310 positioned at the fluid circuit 210 downstream of the compressor 262 and upstream of the turbine 266 of the turbomachine 260. In various embodiments, the heat exchanger 310 is positioned in thermal communication with one or more fan streams of the propulsion system 10. As described above, the one or more fan streams may include a fan bypass stream, or a third stream positioned between the fan stream and a core flowpath. It should be appreciated that the third stream refers to an air stream configured to recover fluid energy to produce a portion of total thrust of the propulsion system. In one embodiment, the portion of total thrust produced through the third stream may include a dedicated exhaust nozzle at an outlet end. In another embodiment, the portion of total thrust produced through the third stream may be mixed with the fan bypass stream. In still another embodiment, the portion of total thrust produced through the third stream may be mixed with the core flowpath downstream of the heat addition system, and egressed through the exhaust section. Various embodiments of the third stream are configured to generate less than 50% of the total thrust of the propulsion system.

The heat exchanger 310 is configured to expel thermal energy or heat from the fluid circuit 210. In certain embodiments, the heat exchanger 310 is configured to input thermal energy or heat to a fuel circuit, such as to heat a flow of fuel prior to injecting the fuel at the heat addition or combustion section. In still certain embodiments, the heat exchanger 310 is configured to input thermal energy or heat to a stream of air passing through one or more fan streams 14. In still various embodiments, the heat exchanger 310 includes a fuel circuit positioned in thermal communication with the fluid circuit 210.

Referring now to FIG. 3 and FIG. 5, in certain embodiments, the vehicle 100, propulsion system 10, and thermal management system 200 include a heat exchanger 315 positioned at the fluid circuit 210 downstream of the compressor section 20 and upstream of the flow control device 220. In various embodiments, the heat exchanger 315 is positioned in thermal communication with one or more fan streams 14 of the propulsion system 10, such as described herein. The heat exchanger 315 is configured to expel thermal energy or heat from the fluid circuit 210. In still certain embodiments, the heat exchanger 315 is configured to input thermal energy or heat to a stream of fluid passing through one or more fan streams 14. In a particular embodiment, the heat exchanger 315 is a precooler positioned at the fluid circuit 210 to remove thermal energy or heat from the fluid prior to providing the fluid to the flow control device 220 and turbine 230. Although depicted in regard to FIG. 3 and FIG. 5, it should be appreciated that other embodiments depicted and described herein may include the heat exchanger 315 defining a precooler positioned at the fluid circuit 210 upstream of the flow control device 220.

Referring now to FIGS. 2-5, in various embodiments, the thermal load 250 includes a lubricant heat exchanger 320 positioned at the fluid circuit 210 downstream of the turbine 230. In still various embodiments, the thermal load 250 includes a lubricant circuit 251 positioned in thermal communication with the fluid circuit 210. The lubricant circuit 251 includes oil or oil-based fluid from a lubricant system 252. The lubricant system 252 may include any appropriate system including pumps, scavenges, and heat exchangers configured to provide lubricant to one or more bearing assemblies, gear assemblies, actuators, or other systems of the propulsion system 10 or vehicle 100. The lubricant circuit 251 is provided in heat exchanger relationship with the fluid circuit 210 at the lubricant heat exchanger 320.

In certain embodiments, the lubricant heat exchanger 320 is configured to receive or remove heat or thermal energy from the lubricant circuit 251 and provide heat or thermal energy to the fluid circuit 210, or particularly the first portion 211 of fluid downstream of the turbine 230. The flow control device 220 may be configured to adjust an amount of the first portion 211 of fluid provided to the turbine 230 and the thermal load 250 based on a desired heat transfer between the fluid circuit 210 and the lubricant circuit 251.

In certain embodiments, such as depicted in FIGS. 2-5, the thermal load 250 is positioned in thermal communication with the fluid circuit 210 downstream of the turbine 230. In particular embodiments, the thermal load 250 including the lubricant system 252 is positioned in thermal communication with the fluid circuit 210 downstream of the turbine 230. In still particular embodiments, such as depicted in FIGS. 2-5, the thermal load 250 including the lubricant system 252 is positioned in thermal communication with the fluid circuit 210 downstream of the turbine 230 and upstream of the flow device 240.

Referring now to FIG. 4, in various embodiments, the thermal load 250 is positioned in thermal communication with the fluid circuit 210 downstream of the turbomachine 260. In certain embodiments, such as described above, the thermal load 250 includes the lubricant system 252 positioned in thermal communication with the fluid circuit 210 downstream of the turbomachine 260. In still various embodiments, the thermal load 250 includes a load heat exchanger 330 positioned in thermal communication with the fluid circuit 210 downstream of the turbomachine 260. In certain embodiments, the load heat exchanger 330 includes one or more of an electric machine, a computing system, or an environmental control system (ECS) (e.g., the computing system 140 and/or the ECS system 150 described in regard to FIG. 1). The load heat exchanger 330 may be configured to provide the fluid from the fluid circuit 210 as a cooling fluid in thermal communication with the electric machine, the computing system, or the environmental control system, or one or fluids thereof. Various embodiments of the electric machine may include a motor and/or generator, a hybrid-electric device, etc. In still various embodiments, the computing system may include avionics, engine controls, vehicle control systems, or other electronics including one or more processors, memory devices, communications devices, circuitry, or other electrical or electronic systems. In still yet various embodiments, the ECS may include a fluid configured for one or more of the cabin of the vehicle, heat transfer fluid for the vehicle, or other fluid device.

Embodiments of the thermal load 250 may include a first thermal load positioned in thermal communication with the fluid circuit 210 downstream of the turbomachine 260 and a second thermal load positioned in thermal communication with the fluid circuit 210 downstream of the turbine 230 and upstream of the flow device 240. In certain embodiments, the first thermal load includes the load heat exchanger 330 such as described herein. In still certain embodiments, the second thermal load includes the lubricant heat exchanger 320 and lubricant system 252.

Still various embodiments of the thermal management system 200 may include one or more valves 290 to divide the fluid at the fluid circuit 210 into a first flow 221 and a second flow 222, such as depicted in FIG. 4. The system 200 may further include one or more second valves 291 to reconnect the flows 221, 222. The valve 290 is positioned upstream of the lubricant heat exchanger 320 and the load heat exchanger 330. The second valve 291 is positioned downstream of the lubricant heat exchanger 320 and the load heat exchanger 330. In certain embodiments, the system 200 includes an exhaust sink 295 at which the fluid from the fluid circuit 210 may be disposed. The exhaust sink 295 may include one or more of an exhaust sink at the turbomachine 260, at the propulsion system 10, or another exhaust sink or ambient environment.

A method for thermal management for a vehicle is provided herein. The method may be executed via the aircraft 100, the propulsion system 10 or the thermal management 200 such as depicted and described in FIGS. 1-5. The method may provide one or more benefits such as described herein with regard to the particular positioning, arrangement, fluid communication, and thermal communication provided in the various embodiments.

The method includes extracting a flow of compressed fluid from a compressor section of a propulsion system, such as described with regard to flow of fluid extracted from the compressor section 20 to the fluid circuit 210. The flow of compressed fluid includes a pressure parameter. The pressure parameter is a measurement, calculation, or signal indicative of the pressure of the compressed fluid. The method further includes generating an output torque via expanding at least a portion of the flow of compressed fluid across a turbine operably connected to a driveshaft, such as described with regard to first portion 211 of the flow of fluid expanded via the turbine 230. The turbine is positioned downstream of the compressor section and upstream of a cooling system, such as described with regard to the turbomachine 260.

In an embodiment, the method includes determining a pressure requirement of the flow of compressed fluid at the cooling system and flowing or otherwise providing the flow of compressed fluid to the cooling system. Referring to FIGS. 2-5, the cooling system, such as the turbomachine 260, is configured to operate from the flow of compressed fluid having the value corresponding to the pressure requirement. In one embodiment, the pressure requirement is a range of pressure at which the cooling system, such as the turbomachine 260, is operable. A minimum pressure may be required for operating the cooling system. A maximum pressure may be required for maintaining desired operability, performance, efficiency, or structural life and durability.

In various embodiments, generating the output torque via expanding at least the portion of the flow of compressed fluid across the turbine includes flowing or otherwise providing, from upstream of the turbine, a first portion of the flow of compressed fluid to the cooling system and providing a second portion of the flow of compressed fluid to the turbine, such as described with regard to the flow control device 220 splitting, diverting, or otherwise apportioning the first portion 211 of fluid to the turbine 230 and providing the second portion 212 of fluid to a flow device 240 such as described herein. In one embodiment, the second portion of the flow of compressed fluid corresponds to the pressure requirement at the cooling system. For instance, referring to FIGS. 2-5, the flow control device 220 may divert the flow of fluid as the second portion 212 having substantially the required pressure for operating the turbomachine 260. In still another embodiment, the first portion of the flow of compressed fluid corresponds to a difference between the pressure requirement at the cooling system and the pressure parameter of the flow of compressed fluid from the compressor section. As such, the first portion 211 of the flow of compressed fluid corresponding to a magnitude of pressure in excess of the pressure requirement may be routed to the turbine 230, and the second portion 212 of the flow of compressed fluid corresponding to a magnitude of pressure required for operating the turbomachine 260 is routed to the turbomachine 260. The method may further include combining the first portion and the second portion of the flow of compressed air, such as described with regard to the flow device 240, and providing the combined flow of compressed air to the cooling system.

In still various embodiments, the method includes generating the output torque via expanding at least the portion of the flow of compressed fluid across the turbine includes converting excess pressure of the flow of compressed fluid from the compressor section into the output torque at the driveshaft, such as described with regard to the thermal management system 200. In an embodiment, converting excess pressure of the flow of compressed fluid corresponds to a difference between a pressure requirement of the flow of compressed fluid at the cooling system and the pressure parameter of the flow of compressed fluid at the compressor section.

In still yet various embodiments, the method includes operating a turbomachine at the cooling system via the output torque from the turbine, such as described with regard to the turbomachine 260 in FIGS. 2-5. In certain embodiments, operating the turbomachine at the cooling system includes flowing or otherwise providing, in serial flow arrangement, the flow of compressed fluid to a compressor at the turbomachine, a heat exchanger positioned downstream of the compressor, and an expander positioned downstream of the compressor. In a particular embodiment, the method includes flowing or otherwise providing the flow of compressed fluid to a thermal load positioned downstream of the expander, such as thermal load 250 described in FIGS. 2-5.

In some embodiments, the method further includes modulating mass flowrate of the flow of compressed fluid to the turbine based at least on a flow control device (e.g., flow control device 220) upstream of the turbine (e.g., turbine 230) and downstream of the compressor section (e.g., compressor section 20 at the propulsion system 10). In an embodiment, modulating mass flowrate of the flow of compressed fluid to the turbine includes flowing or otherwise providing, from the flow control device, a first portion of the flow of compressed fluid to the turbine then expanding the second portion of the flow of compressed fluid across the turbine, and providing, from the flow control device, a second portion of the flow of compressed fluid to the cooling system, such as described with regard to FIGS. 2-5. In still various embodiments, modulating mass flowrate of the flow of compressed fluid to the turbine includes flowing or otherwise providing, from the flow control device, a first portion of the flow of compressed fluid to the turbine, in which the first portion of the flow of compressed fluid corresponds to a difference between the pressure requirement at the cooling system and the pressure parameter of the flow of compressed fluid from the compressor section, and flowing or otherwise providing, from the flow control device, a second portion of the flow of compressed fluid to the cooling system, wherein the second portion of the flow of compressed fluid corresponds to a pressure requirement at the cooling system. In a particular embodiment, modulating mass flowrate of the flow of compressed fluid to the turbine includes adjusting an area of a variable area turbine nozzle of the turbine.

In various embodiments, extracting the flow of compressed fluid from the compressor section of the propulsion system includes extracting the flow of compressed fluid from two or more stations at the compressor section. Each station provides a respective pressure parameter different from one another. In one embodiment, the method includes modulating from which station at the compressor section the flow of compressed fluid is extracted. Modulating from which station at the compressor section the flow of compressed fluid is extracted may be based at least on a pressure requirement at the cooling system and an operating mode of the propulsion system.

Embodiments of the propulsion system 10, vehicle 100, and thermal management system 200 provided herein may improve system efficiency, such as through utilizing the pressure of the fluid from the compressor section of the propulsion system, or particularly from a high pressure compressor, rather than utilizing a pressure regulator or releasing fluid to e.g., an atmospheric condition. Embodiments provided herein may further improve heat transfer from lubricant at a lubricant system. Still further, embodiments provided herein may improve heat transfer from lubricant and additionally from one or more load devices, such as the load heat exchanger. Additionally, or alternatively, cooling fluid at the fluid circuit 210 may be independently adjustable relative to operating condition at the propulsion system 10, such as via the flow control device 220 and/or the flow device 240.

One or more components of the propulsion system 10 and thermal management system 100 described herein may be manufactured or formed using any suitable process, such as an additive manufacturing process, such as a 3-D printing process. The use of such a process may allow such components to be formed integrally, as a single monolithic component, or as any suitable number of sub-components, or at scales and intricacies not previously allowed or conceived in the art. In particular, the additive manufacturing process may allow such component to be integrally formed and include a variety of features not possible when using prior manufacturing methods. For example, the additive manufacturing methods described herein may allow for the manufacture of the turbine 230 and the flow control device 220 as a single, integral component. In further embodiments, the additive manufacturing methods described herein allow for the manufacture of the turbine 230, the flow control device 220, and at least a portion of the conduit 205 having unique features, configurations, thicknesses, materials, densities, fluid passageways, headers, and mounting structures that may not have been possible or practical using prior manufacturing methods.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes. Suitable powder materials for the manufacture of the structures provided herein as integral, unitary, structures, or at scales and intricacies provided herein, include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method for thermal management for a vehicle, the method including extracting a flow of compressed fluid from a compressor section of a propulsion system, wherein the flow of compressed fluid comprises a pressure parameter; and generating an output torque via expanding at least a portion of the flow of compressed fluid across a turbine operably connected to a driveshaft, wherein the turbine is positioned downstream of the compressor section and upstream of a cooling system.

The method of any one or more clauses herein, the method including determining a pressure requirement of the flow of compressed fluid at the cooling system; and providing the flow of compressed fluid to the cooling system, wherein the flow of compressed fluid comprises the pressure requirement.

The method of any one or more clauses herein, wherein generating the output torque via expanding at least the portion of the flow of compressed fluid across the turbine includes providing a first portion of the flow of compressed fluid to the turbine; and providing, from upstream of the turbine, a second portion of the flow of compressed fluid to the cooling system.

The method of any one or more clauses herein, wherein the second portion of the flow of compressed fluid corresponds to a pressure requirement at the cooling system.

The method of any one or more clauses herein, wherein the first portion of the flow of compressed fluid corresponds to a difference between the pressure requirement at the cooling system and the pressure parameter of the flow of compressed fluid from the compressor section.

The method of any one or more clauses herein, the method including combining the first portion and the second portion of the flow of compressed air.

The method of any one or more clauses herein, the method including providing the combined flow of compressed air to the cooling system.

The method of any one or more clauses herein, wherein generating the output torque via expanding at least the portion of the flow of compressed fluid across the turbine comprises converting excess pressure of the flow of compressed fluid from the compressor section into the output torque at the driveshaft.

The method of any one or more clauses herein, wherein converting excess pressure of the flow of compressed fluid corresponds to a difference between a pressure requirement of the flow of compressed fluid at the cooling system and the pressure parameter of the flow of compressed fluid at the compressor section.

The method of any one or more clauses herein, the method including operating a turbomachine at the cooling system via the output torque from the turbine.

The method of any one or more clauses herein, wherein operating the turbomachine at the cooling system includes providing, in serial flow arrangement, the flow of compressed fluid to a compressor at the turbomachine, a heat exchanger positioned downstream of the compressor, and an expander positioned downstream of the compressor.

The method of any one or more clauses herein, the method including providing the flow of compressed fluid to a thermal load positioned downstream of the expander.

The method of any one or more clauses herein, the method including modulating mass flowrate of the flow of compressed fluid to the turbine based at least on a flow control device upstream of the turbine and downstream of the compressor section.

The method of any one or more clauses herein, wherein modulating mass flowrate of the flow of compressed fluid to the turbine includes providing, from the flow control device, a first portion of the flow of compressed fluid to the turbine then expanding the second portion of the flow of compressed fluid across the turbine; and providing, from the flow control device, a second portion of the flow of compressed fluid to the cooling system.

The method of any one or more clauses herein, wherein modulating mass flowrate of the flow of compressed fluid to the turbine includes providing, from the flow control device, a first portion of the flow of compressed fluid to the turbine, wherein the first portion of the flow of compressed fluid corresponds to a difference between the pressure requirement at the cooling system and the pressure parameter of the flow of compressed fluid from the compressor section; and providing, from the flow control device, a second portion of the flow of compressed fluid to the cooling system, wherein the second portion of the flow of compressed fluid corresponds to a pressure requirement at the cooling system.

The method of any one or more clauses herein, wherein modulating mass flowrate of the flow of compressed fluid to the turbine comprises adjusting an area of a variable area turbine nozzle of the turbine.

The method of any one or more clauses herein, wherein extracting the flow of compressed fluid from the compressor section of the propulsion system comprises extracting the flow of compressed fluid from two or more stations at the compressor section, wherein each station provides a respective pressure parameter different from one another.

The method of any one or more clauses herein, the method including modulating from which station at the compressor section the flow of compressed fluid is extracted.

The method of any one or more clauses herein, wherein modulating from which station at the compressor section the flow of compressed fluid is extracted is based at least on a pressure requirement at the cooling system and an operating mode of the propulsion system.

The method of any one or more clauses herein, the method including providing the flow of compressed fluid to a thermal load downstream of the turbine.

A thermal management system for an aircraft, the system configured to execute steps of the method of any clause herein.

A thermal management system, the system including a propulsion system having a compressor section and a turbine section in serial flow arrangement; a fluid circuit extended in fluid communication from the compressor section to a flow control device, and wherein a first portion of the fluid circuit is extended in fluid communication from the flow control device to a turbine, and wherein a second portion of the fluid circuit is extended in fluid communication from the flow control device to a flow device, and wherein the fluid circuit configured to receive a flow of fluid from the compressor section of the propulsion system and provide a first portion of the flow of fluid to expand through the turbine, and wherein the flow of fluid expanded through the turbine is provided in thermal communication, via the fluid circuit, with a thermal load, and wherein a second portion of the flow of fluid is provided to the flow device bypassing the turbine.

The thermal management system of any clause herein, wherein the fluid circuit is extended in fluid communication with a cooling system downstream of the turbine.

The thermal management system of any clause herein, wherein the fluid circuit is extended in fluid communication from the flow device to the cooling system.

The thermal management system of any clause herein, wherein the fluid circuit is extended from the cooling system to provide the flow of fluid in thermal communication with the thermal load.

The thermal management system of any clause herein, wherein the cooling system is a turbomachine including a turbine operably coupled to a compressor An aircraft including the thermal management system of any clause herein.

An aircraft configured to execute one or more steps of the method of any one or more clauses herein.

A thermal management system for a propulsion system of an aircraft, the thermal management system comprising: a fluid circuit configured to provide a flow of a compressed fluid from a compressor section of the propulsion system to, in serial flow order, a first turbine, a compressor, a second turbine, a thermal load, and an exhaust sink; and a heat exchanger disposed in a fan stream of the propulsion system at a location along the fluid circuit between the compressor and the second turbine, wherein the fluid circuit extends through and is in thermal communication with the heat exchanger.

The thermal management system of any one or more clauses herein, further comprising a flow control device disposed along and in fluid communication with the fluid circuit downstream from the compressor section and upstream from the first turbine.

The thermal management system of any one or more clauses herein, further comprising a flow device disposed along and in fluid communication with the fluid circuit downstream from the compressor section and the first turbine, and upstream from the compressor.

The thermal management system of any one or more clauses herein, wherein the thermal load includes a lubricant heat exchanger disposed along and in thermal communication with the fluid circuit between the second turbine and the exhaust sink.

The thermal management system of any one or more clauses herein, wherein the thermal load includes a load heat exchanger disposed along the fluid circuit between the second turbine and the exhaust sink.

The thermal management system of any one or more clauses herein, wherein the thermal load includes a lubricant heat exchanger and a load heat exchanger disposed along the fluid circuit between the second turbine and the exhaust sink.

The thermal management system of any one or more clauses herein, further comprising a valve disposed along and in fluid communication with the fluid circuit downstream from the second turbine and upstream from the exhaust sink, wherein the valve is configured to divide the compressed fluid into a first flow and a second flow, wherein the first flow is directed through the load heat exchanger via the fluid circuit, and the second flow is directed through the lubricant heat exchanger via the fluid circuit.

The thermal management system of any one or more clauses herein, wherein the exhaust sink is the propulsion system.

The thermal management system of any one or more clauses herein, wherein the exhaust sink is atmosphere.

The thermal management system of any one or more clauses herein, wherein the first turbine, the compressor, and the second turbine are each coupled together via a driveshaft.

An aircraft, comprising: a propulsion system including a gas turbine engine, the gas turbine engine comprising a compressor section, a combustion system, a high pressure turbine, and a fan stream; and a thermal management system, the thermal management system comprising: a fluid circuit configured to provide a flow of a compressed fluid from the compressor section of the propulsion system to, in serial flow order, a first turbine, a compressor, a second turbine, a thermal load, and an exhaust sink; and a heat exchanger disposed in the fan stream of the propulsion system at a location along the fluid circuit between the compressor and the second turbine, wherein the fluid circuit extends through and is in thermal communication with the heat exchanger.

The aircraft of any one or more clauses herein, wherein the thermal management system further comprises a flow control device disposed along and in fluid communication with the fluid circuit downstream from the compressor section and upstream from the first turbine.

The aircraft of any one or more clauses herein, wherein the thermal management system further comprises a flow device disposed along and in fluid communication with the fluid circuit downstream from the compressor section and the first turbine, and upstream from the compressor.

The aircraft of any one or more clauses herein, wherein the thermal load includes a lubricant heat exchanger disposed along and in thermal communication with the fluid circuit between the second turbine and the exhaust sink.

The aircraft of any one or more clauses herein, wherein the thermal load includes a load heat exchanger disposed along the fluid circuit between the second turbine and the exhaust sink.

The aircraft of any one or more clauses herein, wherein the thermal load includes a lubricant heat exchanger and a load heat exchanger disposed along the fluid circuit between the second turbine and the exhaust sink.

The aircraft of any one or more clauses herein, wherein the thermal load further comprises a valve disposed along and in fluid communication with the fluid circuit downstream from the second turbine and upstream from the exhaust sink, wherein the valve is configured to divide the compressed fluid into a first flow and a second flow, wherein the first flow is directed through the load heat exchanger via the fluid circuit, and the second flow is directed through the lubricant heat exchanger via the fluid circuit.

The aircraft of any one or more clauses herein, wherein the exhaust sink is the propulsion system.

The aircraft of any one or more clauses herein, wherein the exhaust sink is atmosphere.

The aircraft of any one or more clauses herein, wherein the first turbine, the compressor, and the second turbine are coupled together via a driveshaft.

A thermal management system for a propulsion system of an aircraft, the thermal management system comprising: a flow control device in fluid communication with a compressor section of the propulsion system, wherein the flow control device is configured to split a flow of compressed fluid from the compressor section into a first portion of the compressed fluid and a second portion of the compressed fluid; a first turbine disposed downstream from and in fluid communication with the flow control device, wherein the first turbine is configured to receive the first portion of the compressed fluid; a first thermal load in thermal communication with the first portion of the compressed fluid downstream from the compressor; a compressor disposed downstream from and in fluid communication with the flow control device; a second turbine disposed downstream from and in fluid communication with the compressor; and a second thermal load in thermal communication with the second portion of the compressed fluid downstream from the second turbine.

The thermal management system of any one or more clauses herein, further comprising a heat exchanger disposed in a fan stream of the propulsion system, wherein the heat exchanger is in thermal communication with the second portion of the compressed fluid downstream form the compressor and upstream from the second turbine.

The thermal management system of any one or more clauses herein, further comprising a flow device disposed downstream from and in fluid communication with the flow control device upstream from the compressor, wherein the flow device is configured to control flow of the second portion of the compressed fluid to the compressor.

The thermal management system of any one or more clauses herein, wherein the first thermal load includes a lubricant heat exchanger in thermal communication with the first portion of the compressed fluid circuit downstream from the first turbine.

The thermal management system of any one or more clauses herein, further comprising a heat exchanger disposed in a fan stream of the propulsion system, wherein the heat exchanger is in thermal communication with the second portion of the compressed fluid between the compressor and the second turbine.

The thermal management system of any one or more clauses herein, further comprising a heat exchanger in thermal communication with the flow of compressed fluid upstream from the flow control device and downstream from the compressor section.

The thermal management system of any one or more clauses herein, wherein the heat exchanger is at least partially disposed within a fan stream of the propulsion system.

The thermal management system of any one or more clauses herein, further comprising an exhaust sink disposed downstream from the first thermal load, wherein the first portion of the compressed fluid flows to the exhaust sink.

The thermal management system of any one or more clauses herein, wherein the exhaust sink is atmosphere.

The thermal management system of any one or more clauses herein, wherein the first turbine, the compressor, and the second turbine are coupled together via a driveshaft.

What is claimed is:

1. A thermal management system for a propulsion system of an aircraft, the thermal management system comprising:
    a flow control device in fluid communication with a compressor section of the propulsion system, wherein the flow control device is configured to split a flow of compressed fluid from the compressor section into a first portion of the compressed fluid and a second portion of the compressed fluid;
    a first turbine disposed downstream from and in fluid communication with the flow control device, wherein the first turbine is configured to receive the first portion of the compressed fluid;
    a first thermal load in thermal communication with the first portion of the compressed fluid downstream from the compressor;
    a compressor disposed downstream from and in fluid communication with the flow control device;
    a second turbine disposed downstream from and in fluid communication with the compressor; and
    a second thermal load in thermal communication with the second portion of the compressed fluid downstream from the second turbine.

2. The thermal management system of claim 1, further comprising a heat exchanger disposed in a fan stream of the propulsion system, wherein the heat exchanger is in thermal communication with the second portion of the compressed fluid downstream form the compressor and upstream from the second turbine.

3. The thermal management system of claim 1, further comprising a flow device disposed downstream from and in fluid communication with the flow control device upstream from the compressor, wherein the flow device is configured to control flow of the second portion of the compressed fluid to the compressor.

4. The thermal management system of claim 1, wherein the first thermal load includes a lubricant heat exchanger in thermal communication with the first portion of the compressed fluid circuit downstream from the first turbine.

5. The thermal management system of claim 1, further comprising a heat exchanger disposed in a fan stream of the propulsion system, wherein the heat exchanger is in thermal communication with the second portion of the compressed fluid between the compressor and the second turbine.

6. The thermal management system of claim 1, further comprising a heat exchanger in thermal communication with the flow of compressed fluid upstream from the flow control device and downstream from the compressor section.

7. The thermal management system of claim 6, wherein the heat exchanger is at least partially disposed within a fan stream of the propulsion system.

8. The thermal management system of claim 1, further comprising an exhaust sink disposed downstream from the first thermal load, wherein the first portion of the compressed fluid flows to the exhaust sink.

9. The thermal management system of claim 8, wherein the exhaust sink is atmosphere.

10. The thermal management system of claim 1, wherein the first turbine, the compressor, and the second turbine are coupled together via a driveshaft.

\* \* \* \* \*